March 17, 1964  E. F. GLASS  3,124,922
CASTER WHEEL FOR A SIDE DELIVERY RAKE
Filed March 7, 1962  2 Sheets-Sheet 1

INVENTOR
EMMETT F. GLASS
BY
ATTORNEY

March 17, 1964   E. F. GLASS   3,124,922
CASTER WHEEL FOR A SIDE DELIVERY RAKE
Filed March 7, 1962   2 Sheets-Sheet 2

INVENTOR
EMMETT F. GLASS
BY Joseph A. Brown
ATTORNEY

United States Patent Office

3,124,922
Patented Mar. 17, 1964

3,124,922
CASTER WHEEL FOR A SIDE DELIVERY RAKE
Emmett F. Glass, Akron, Pa., assignor to Sperry Rand Corporation, New Holland, Pa., a corporation of Delaware
Filed Mar. 7, 1962, Ser. No. 178,046
4 Claims. (Cl. 56—377)

This invention relates to side delivery hay rakes and more particularly to a semi-mounted, tractor powered rake supported at its rear end on caster wheels.

Conventionally, two caster wheels are provided on semi-mounted side delivery hay rakes. The spindles of the caster wheels rotate about vertical axes substantially spaced rearwardly of the rake frame so that the wheels may pivot 360° and remain free of the rake frame regardless of whether the rake is traveling forwardly or rearwardly. This substantial spacing between the rake frame and the caster wheels lessens the gauging effectiveness provided by the wheels. If the wheels are closer to the rake frame, gauging will improve. However, then there will be interference problems.

The main object of this invention is to provide a semi-mounted rake having caster wheels so related to the rake frame that better gauging characteristics are obtained than that provided by similar rakes of prior design.

Another object of this invention is to provide means for mounting a caster wheel in close proximity to the rake frame of a semi-mounted rake while maintaining proper clearance between the caster wheel and the rake frame at all times.

Another object of this invention is to provide a caster wheel on a semi-mounted rake of the character described which gives the rake greater stability when in use in the field or on a highway and lifts the rake frame when the rake is driven rearwardly to thereby protect the rake tines from damage and maintain the frame free of the caster wheels.

A further object of this invention is to provide a caster wheel structure of the character described which is simply designed and of low cost.

Other objects of this invention will be apparent hereinafter from the specification and from the recital in the appended claims.

Figure 1:
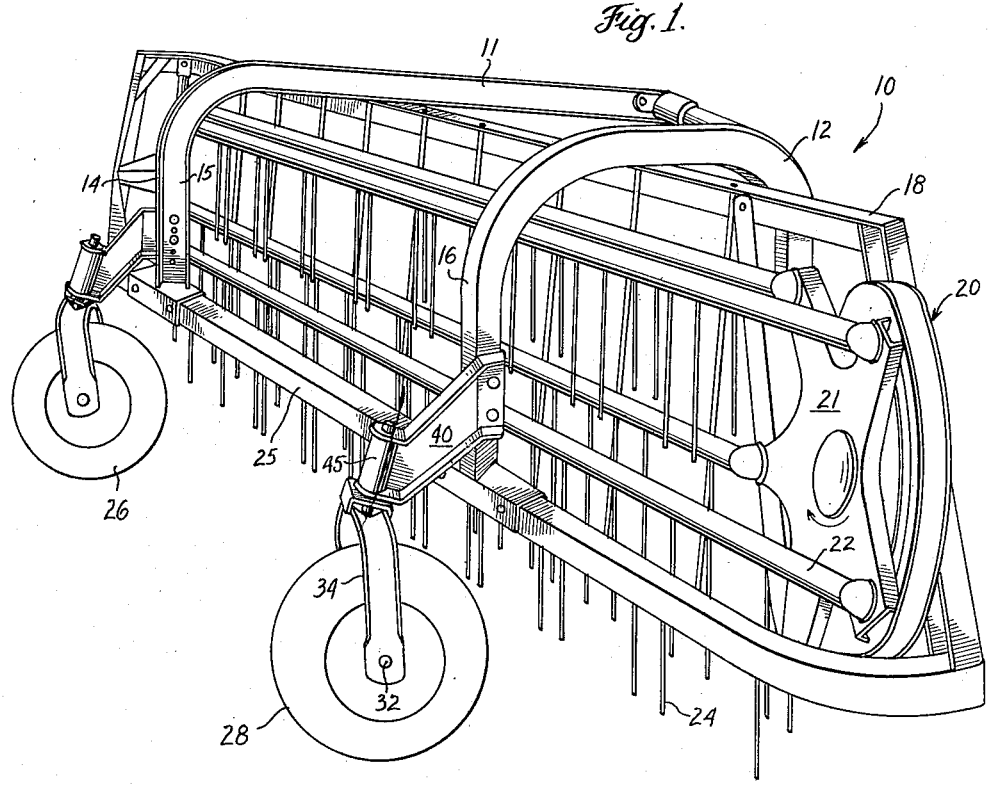
FIG. 1 is a perspective view of a semi-mounted side delivery hay rake having caster wheels connected to the frame of the rake according to this invention, the caster wheels being shown in the position they assume when the rake is moved rearwardly.

Referring now to the drawings by numerals of reference, and first to FIG. 1, 10 denotes a semi-mounted side delivery hay rake which comprises an arched frame 11, high in the middle and having a downwardly extending forward portion 12 and a rear portion 14 which includes laterally spaced depending legs 15 and 16. The frame 11 carries a basket assembly 18 which rotatably supports a raking reel 20. The raking reel includes spider means 21 which supports rake bars 22 carrying rake tines 24. The rake reel is conventional, the spider means 21 being rotatable in a clockwise direction when viewed as shown in FIG. 1 to engage material resting on the ground on forward travel of the rake and to deliver the material toward the left end of the rake.

The forward end 12 of the rake frame 11 is adapted to be connected to and supported by a tractor, not shown, for towing the rake. Power is supplied for rotating rake reel 20 by a conventional power-take-off connection to the tractor.

The rear end 14 of rake frame 11 includes a frame member 25 which extends diagonally relative to the direction of travel of the rake and generally parallel to the diagonal extension of the raking reel. For supporting the frame 11 and its rear end 14, caster wheels 26 and 28 are provided and connected to the legs 15 and 16, respectively. Both caster wheels are located in the same relationship to the frame 11 and in close proximity to frame member 25. The wheels are closer to the rake frame than is conventional whereby a better gauging action is obtained. As a result there is less breakage of the rake tine 24. The close relationship of the caster wheels with the frame is achieved by the novel mounting structure of this invention. Both caster wheels are mounted in the same way.

Figure 4:
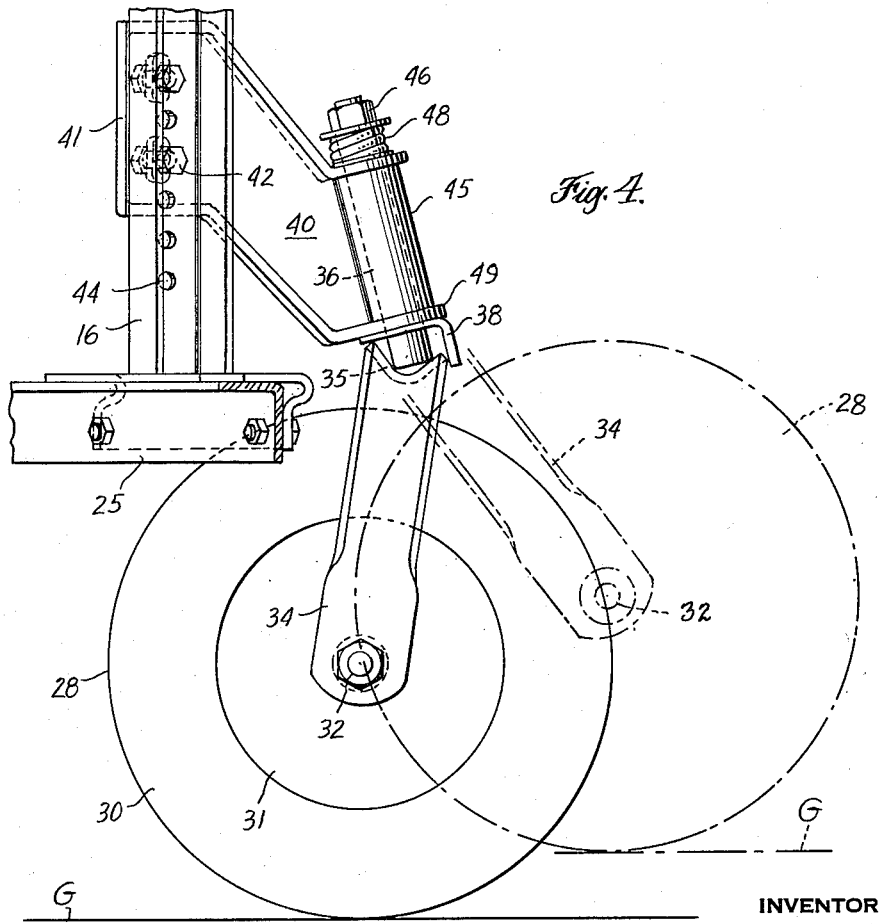
FIG. 4 is a side elevation of FIG. 3.

Each caster wheel comprises a tire 30 mounted on wheel rim 31 and rotatably supported at 32 on a fork member 34. The legs of the fork straddle the tire and the bight portion 35 thereof carries a spindle 36. The connection between fork 34 and spindle 36 includes a bracket 38. The parts are welded together as shown in FIG. 4 whereby the fork 34 and the spindle 36 form an obtuse angle.

Each caster wheel is rotatably carried on a support member 40 which extends downwardly and rearwardly from the rear portion 14 of the frame 11. The support for wheel 26 is carried on leg 15 and the support for wheel 28 is carried on leg 16. At its upper forward end, each support is connected to its associated frame leg by nut and bolt means 42 which project through holes 44. A series of vertically extending holes is provided whereby the position of the support relative to the frame 11 may be adjusted. At their lower rearward ends, each support 40 has a sleeve bearing 45 located in a vertical plane and the axis of which extends forwardly whereby the upper end of the sleeve is forwardly of the lower end. The caster wheel spindles 36 extend through the support sleeve bearings 45 and the wheels are attached to the supports by bolt means 46 at the upper end of the spindles. At its upper end, each spindle 36 is surrounded by a spring 48 which biases the spindle upwardly and causes its bracket 38 to press against the lower bottom portion 49 of its support 40. As a result, when the rake is lifted from the ground by the lift mechanism of the tractor, the caster wheels will be held by the springs in the positions they assumed at the time when the rake was lifted. Wobbling of the wheels when the rake is in transport is eliminated.

Figure 2:
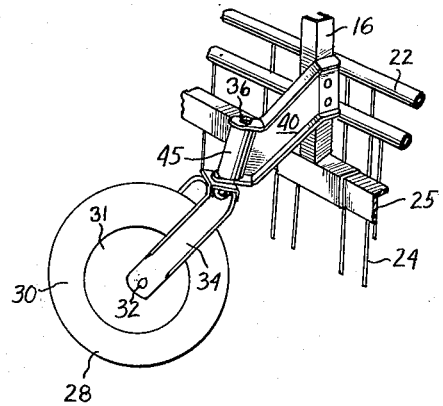
FIG. 2 is a fragmentary view of the rake showing one of the caster wheels and the position it assumes when the rake is travelling forwardly.
Figure 3:
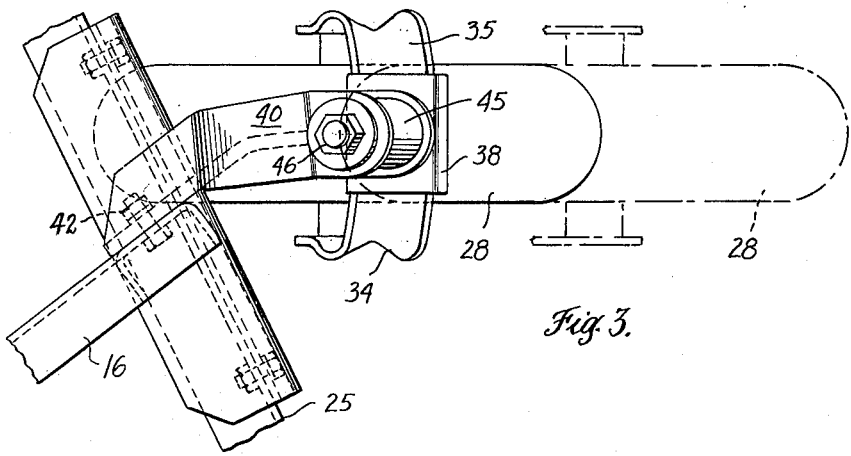
FIG. 3 is an enlarged plan view of one of the caster wheels showing in solid lines the position the wheel assumes when the rake travels rearwardly and in dotted lines the position the wheel assumes when the rake is travelling forwardly.

When the caster wheels 26 and 28 are in engagement with the ground G and the rake is travelling forwardly, that is from left to right in FIG. 1, the wheels assume positions as shown in FIG. 2. The fork portions 34 extend downwardly and rearwardly from the rake frame 11. This gives the rake substantial stability and there is less tendency for the caster wheels to wobble at high ground speeds than would be the case if the spindles 35 extended vertically. With the caster wheels in engagement with the ground and upon moving the rake rearwardly, the wheels pivot 180° and assume the position shown in FIGS. 1, 3 and 4. As they swivel, the wheels exert a lifting action on the frame 11 and pass beneath frame member 25 at the rearward end of the frame. This lifting action is important because it is relied upon to maintain proper operating clearance between the tires 30 of the caster wheels and the frame of the rake, particularly transverse member 25. The wheels are located so close to the rake frame, that if the spindles 36 extended on vertical axes, the tires of the caster wheels would engage the rake frame upon backing of the rake. The close relationship of the wheels to the rake frame without interference is achieved by having the caster wheels rotatable about forwardly inclined axes rather than vertical axes. By having the wheels so close to the rake basket, outstanding gauging characteristics are achieved on forward travel of the rake. Tine breakage is minimized. By inclining the spindle axes forwardly, the wheels can be placed closer to the basket than would otherwise be the case. In addition to maintaining the clearance between the caster wheels and the frame when the rake is moved rearwardly, the lifting of the rake basket also protects the rake tines by removing them from contact with the ground when the rake is moved in a rearward direction.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A side delivery rake comprising a frame having a forward end and a rear end, said forward end being attachable to a tractor or the like for moving the rake over the ground, a raking reel mounted on said frame and extending diagonally relative to ground travel, said frame rear end including a member extending generally parallel to the extension of said reel, a support connected to said rear end of said frame and extending rearwardly therefrom, a sleeve bearing on said support, said sleeve bearing extending in a vertical plane and having an axis inclined forwardly, with an upper end of the sleeve forward of a lower end, and a caster wheel mounted on said support, said caster wheel comprising a tire, a fork straddling and rotatably supporting the tire, and a spindle fixedly connected to said fork and forming therewith an obtuse angle, said spindle extending through said sleeve bearing and providing a forwardly inclined axis around which the caster wheel is pivotal 360°, said caster wheel being located in close proximity to said frame member with said fork extending rearwardly when the rake is travelling forwardly and pivoting 180° about said inclined axis to extend the fork forwardly when the rake is moved rearwardly, the proximity of said caster wheel to said frame member being such that if said spindle axis extended vertically the movement of the rake from forward to rearward travel would result in the wheel striking said frame member.

2. A side delivery rake as recited in claim 1 wherein said frame is arched, being high in the middle and low at said forward end and said rear end, the rear end having a pair of depending legs and said frame member being connected to the lower ends of said legs and in a horizontal plane which crosses an upper portion of the wheel of said caster wheel regardless of whether the rake is travelling forwardly or rearwardly.

3. A side delivery rake as recited in claim 2 wherein the wheel of said caster wheel is rearwardly of said frame member when the rake is travelling forwardly and swivels to a position beneath the frame member when the rake is moved rearwardly, the incline of the caster wheel spindle producing a lifting of said frame when the caster wheel swivels from a rearward to a forward position.

4. A side delivery rake as recited in claim 2 wherein said support extends downwardly and rearwardly from one of said depending legs, the upper forward end of the support being connected to said one depending leg by means which permits vertical adjustment of the caster wheel, the wheel of the caster wheel being spaced from said frame member regardless of the position of adjustment of said support.

References Cited in the file of this patent

UNITED STATES PATENTS

| | | |
|---|---|---|
| 2,299,310 | Dammeyer | Oct. 20, 1942 |
| 2,639,575 | Richey | May 26, 1953 |